United States Patent
John Wilson et al.

(10) Patent No.: US 10,686,506 B2
(45) Date of Patent: Jun. 16, 2020

(54) SUBSET BASED SPATIAL QUASI-COLOCATION PARAMETER INDICATION USING MULTIPLE BEAMS

(71) Applicant: QUALCOMM Incorporated, San Diego, CA (US)

(72) Inventors: Makesh Pravin John Wilson, San Diego, CA (US); Tao Luo, San Diego, CA (US); June Namgoong, San Diego, CA (US); Sony Akkarakaran, Poway, CA (US); Xiao Feng Wang, San Diego, CA (US); Sumeeth Nagaraja, San Diego, CA (US); Juan Montojo, San Diego, CA (US); Shengbo Chen, San Diego, CA (US); Kaushik Chakraborty, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/053,547

(22) Filed: Aug. 2, 2018

(65) Prior Publication Data
US 2019/0044593 A1 Feb. 7, 2019

Related U.S. Application Data

(60) Provisional application No. 62/541,651, filed on Aug. 4, 2017.

(51) Int. Cl.
*H04L 5/00* (2006.01)
*H04W 72/04* (2009.01)
(Continued)

(52) U.S. Cl.
CPC ......... *H04B 7/0617* (2013.01); *H04B 7/0695* (2013.01); *H04B 7/088* (2013.01);
(Continued)

(58) Field of Classification Search
CPC ... H04L 5/0051; H04L 5/0053; H04B 7/0617; H04B 7/088; H04B 7/0695;
(Continued)

(56) References Cited

U.S. PATENT DOCUMENTS

| 10,367,677 B2 * | 7/2019 | Parkvall ............... H04J 11/0079 |
| 2016/0165583 A1 | 6/2016 | Ho et al. |

(Continued)

FOREIGN PATENT DOCUMENTS

| WO | 2017092536 A1 | 6/2017 |
| WO | 2017123079 A1 | 7/2017 |
| WO | 2017195082 A1 | 11/2017 |

OTHER PUBLICATIONS

Ericsson: "Beam Management Overview", 3GPP Draft; R1-1702674, 3rd Generation Partnership Project (3GPP), Mobile Competence Centre, 650, Route Des Lucioles ; F-06921 Sophia-Antipolis Cedex, France, vol. RAN WG1, No. Athens, Greece; Feb. 13, 2017-Feb. 17, 2017, Feb. 12, 2017 (Feb. 12, 2017), pp. 1-6, XP051209821, Retrieved from the Internet: URL: http://www.3gpp.org/ftp/Meetings_3GPP_SYNC/RAN1/Docs/ [retrieved on Feb. 12, 2017].
(Continued)

*Primary Examiner* — Asghar H Bilgrami
(74) *Attorney, Agent, or Firm* — Linda G. Gunderson; Patterson & Sheridan LLP

(57) ABSTRACT

Aspects of the present disclosure relate to deriving spatial receive parameters for quasi-colocation at a user equipment (UE). An exemplary method generally includes receiving a plurality of beams from a base station in a plurality of coarse directions, determining, based on the plurality of beams, a first spatial colocation parameter, transmitting an indication of a coarse direction associated with a beam having a highest receive strength of the plurality of beams, receiving a plurality of second beams from the base station based on the indication, the plurality of second beams having a narrower
(Continued)

beam width than the plurality of beams and covering a beam width of the beam associated with the indicated coarse direction, determining, based on the plurality of second beams, a second spatial colocation parameter, transmitting an indication of the second beam having a highest receive strength, and refining at least one of the first or second spatial colocation parameters.

30 Claims, 13 Drawing Sheets

(51) Int. Cl.
| | |
|---|---|
| *H04W 72/08* | (2009.01) |
| *H04W 88/08* | (2009.01) |
| *H04B 7/06* | (2006.01) |
| *H04B 7/08* | (2006.01) |
| *H04W 16/28* | (2009.01) |
| *H04W 76/27* | (2018.01) |
| *H04W 88/02* | (2009.01) |

(52) U.S. Cl.
CPC ....... *H04W 72/046* (2013.01); *H04W 72/085* (2013.01); *H04W 16/28* (2013.01); *H04W 72/042* (2013.01); *H04W 76/27* (2018.02); *H04W 88/02* (2013.01); *H04W 88/08* (2013.01)

(58) Field of Classification Search
CPC . H04W 72/085; H04W 72/042; H04W 88/08; H04W 72/046
See application file for complete search history.

(56) References Cited

U.S. PATENT DOCUMENTS

| | | | | |
|---|---|---|---|---|
| 2017/0331670 | A1* | 11/2017 | Parkvall | H04W 52/0274 |
| 2017/0359826 | A1 | 12/2017 | Islam et al. | |
| 2018/0062720 | A1 | 3/2018 | Islam et al. | |
| 2018/0083680 | A1 | 3/2018 | Guo et al. | |
| 2018/0278311 | A1* | 9/2018 | Qiu | H04B 7/0617 |
| 2019/0074880 | A1* | 3/2019 | Frenne | H04B 7/0626 |

OTHER PUBLICATIONS

Intel Corporation: "Details for DL Beam Management", 3GPP Draft; R1-1710526 Details for DL Beam Management , 3rd Generation Partnership Project (3GPP), Mobile Competence Centre, 650, Route Des Lucioles ; F-06921 Sophia-Antipolis Cedex, France, vol. RAN WG1, No. Qingdao. China; Jun. 29, 2017-Jun. 30, 2017, Jun. 26, 2017 (Jun. 26, 2017), pp. 1-13, XP051299733, Retrieved from the Internet: URL: http://www.3gpp.org/ftp/Meetings_3GPP_SYNC/RAN1/Docs/ [retrieved on Jun. 26, 2017].
Intel Corporation: "On QCL for Different BW Parts and Other QCL Details", 3GPP DRAFT; R1-1710539 on QCL for Different BW Parts and Other QCL Details, 3rd Generation Partnership Project (3GPP), Mobile Competence Centre, 650, Route Des Lucioles ; F-06921 Sophia-Antipolis Cedex, France, vol. RAN WG1, No. Qingdao. P.R. China; Jun. 27, 2017-Jun. 30, 2017, Jun. 26, 2017 (Jun. 26, 2017), pp. 1-5, XP051299746, Retrieved from the Internet: URL: http://www.3gpp.org/ftp/Meetings_3GPP_SYNC/RAN1/Docs/ [retrieved on Jun. 26, 2017].
International Search Report and Written Opinion—PCT/US2018/045196—ISA/EPO—Nov. 6, 2018.
National Instruments: "Discussion on Nested Usage of RS for Beam Measurement", 3GPP Draft; R1-1708270 Discussion on Nested Usage of RS for Beam Measurement Final, 3rd Generation Partnership Project (3GPP), Mobile Competence Centre, 650, Route Des Lucioles ; F-06921 Sophia-Antipolis Cedex, France, vol. RAN WG1, No. Hangzhou; May 15, 2017-May 19, 2017, May 14, 2017 (May 14, 2017), pp. 1-5, XP051273463, Retrieved from the Internet: URL: http://www.3gpp.org/ftp/Meetings_3GPP_SYNC/RAN1/Docs/ [retrieved on May 14, 2017].
QUALCOMM: "Beam Management for NR", 3GPP Draft; 3GPP TSG-RAN1 #88bis, R1-1705581, Beam Management for NR, 3rd Generation-Partnership Project (3GPP), Mobile Competence Centre, 650, Route Des Lucioles, F-06921 Sophia-Antipolis Cedex, France, vol. RAN WG1, No. Spokane, USA; Apr. 3, 2017-Apr. 7, 2017, Apr. 2, 2017 (Apr. 2, 2017), XP051243709, pp. 1-7, Retrieved from the Internet: URL:http://www.3gpp.org/ftp/Meetings_3GPP_SYNC/RAN1/Docs/ [retrieved on Apr. 2, 2017] the whole document.
QUALCOMM: "Beam Management for NR", 3GPP DRAFT; R1-1711160, 3rd Generation Partnership Project (3GPP), Mobile Competence Centre; 650, Route Des Lucioles; F-06921 Sophia-Antipolis Cedex; France, vol. RAN WG1, No. Qingdao, P.R. China; Jun. 27, 2017-Jun. 30, 2017 Jun. 26, 2017, XP051300360, Retrieved from the Internet: URL:http://www.3gpp.org/ftp/Meetings_3GPP_SYNC/RAN1/Docs/ [retrieved on Jun. 26, 2017], 13 pages.

* cited by examiner

SUBSET BASED SPATIAL QUASI-COLOCATION PARAMETER INDICATION USING MULTIPLE BEAMS

CROSS-REFERENCE TO RELATED APPLICATIONS

This application claims benefit of U.S. Provisional Patent Application Ser. No. 62/541,651, filed Aug. 4, 2017 and entitled "Subset Based Spatial Quasi-Colocation Parameter Indication Using Multiple Beams," which is assigned to the assignee hereof, the contents of which are hereby incorporated by reference in its entirety.

INTRODUCTION

Field of the Disclosure

Aspects of the present disclosure relate to wireless communications, and more particularly, spatial colocation parameter indication for beam selection in wireless communications.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC FDMA) systems, and time division synchronous code division multiple access (TD-SCDMA) systems, to name a few.

In some examples, a wireless multiple-access communication system may include a number of base stations, each simultaneously supporting communication for multiple communication devices, otherwise known as user equipment (UEs). In a Long Term Evolution (LTE) or LTE Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

As described herein, certain wireless systems may employ directional beams for transmission and reception.

Certain aspects of the present disclosure provide a method for wireless communications that may be performed, for example, by a user equipment (UE). The method generally includes receiving a plurality of beams from a base station, each beam being transmitted from the base station in a plurality of coarse directions; determining, based on the plurality of beams, a first spatial colocation parameter; transmitting, to the base station, an indication of one of the plurality of coarse directions associated with a beam of the plurality of beams having a highest receive strength of the plurality of beams; receiving a plurality of second beams from the base station based on the indication, the plurality of second beams having a narrower beam width than the plurality of beams and covering a beam width of the beam associated with the indicated coarse direction; determining, based on the plurality of second beams, a second spatial colocation parameter; transmitting, to the base station, an indication of one of the plurality of second beams having a highest receive strength of the plurality of second beams; and refining at least one of the first or second spatial colocation parameters.

Certain aspects of the present disclosure provide a method for wireless communications that may be performed, for example, by a base station (BS). The method generally includes transmitting a plurality of beams to a user equipment (UE), each beam being transmitted in a plurality of coarse directions; receiving, from the UE, an indication of a coarse direction associated with a beam of the plurality of beams having a highest receive strength of the plurality of beams; transmitting a plurality of second beams to the UE based on the indication, the plurality of second beams having a narrower beam width than the plurality of beams and covering a beam width of the beam associated with the indicated coarse direction; receiving, from the UE, an indication of one of the plurality of second beams having a highest receive strength of the plurality of second beams; and initiating a spatial colocation parameter refinement procedure based on one or more of the beam associated with the indicated coarse direction or the indicated second beam.

Certain aspects of the present disclosure provide an apparatus for wireless communication. The apparatus generally includes a processor and a memory. The processor is generally configured to receive a plurality of beams from a base station, each beam being transmitted from the base station in a plurality of coarse directions; determine, based on the plurality of beams, a first spatial colocation parameter; transmit, to the base station, an indication of one of the plurality of coarse directions associated with a beam of the plurality of beams having a highest receive strength of the plurality of beams; receive a plurality of second beams from the base station based on the indication, the plurality of second beams having a narrower beam width than the plurality of beams and covering a beam width of the beam associated with the indicated coarse direction; determine, based on the plurality of second beams, a second spatial colocation parameter; transmit, to the base station, an indication of one of the plurality of second beams having a highest receive strength of the plurality of second beams; and refine at least one of the first or second spatial colocation parameters.

Certain aspects of the present disclosure provide an apparatus for wireless communication. The apparatus generally includes a processor and a memory. The processor is generally configured to transmit a plurality of beams to a user equipment (UE), each beam being transmitted in a plurality of coarse directions; receive, from the UE, an indication of a coarse direction associated with a beam of the plurality of beams having a highest receive strength of the plurality of beams; transmit a plurality of second beams to the UE based on the indication, the plurality of second beams having a narrower beam width than the plurality of beams and covering a beam width of the beam associated with the indicated coarse direction; receive, from the UE, an indication of one of the plurality of second beams having a highest receive strength of the plurality of second beams; and initiate a spatial colocation parameter refinement procedure based on one or more of the beam associated with the indicated coarse direction or the indicated second beam.

Aspects generally include methods, apparatus, systems, computer readable mediums, and processing systems, as substantially described herein with reference to and as illustrated by the accompanying drawings. The phrase computer readable medium does not refer to a transitory propagating signal. Rather, the computer readable medium may be a non-transitory computer readable medium.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
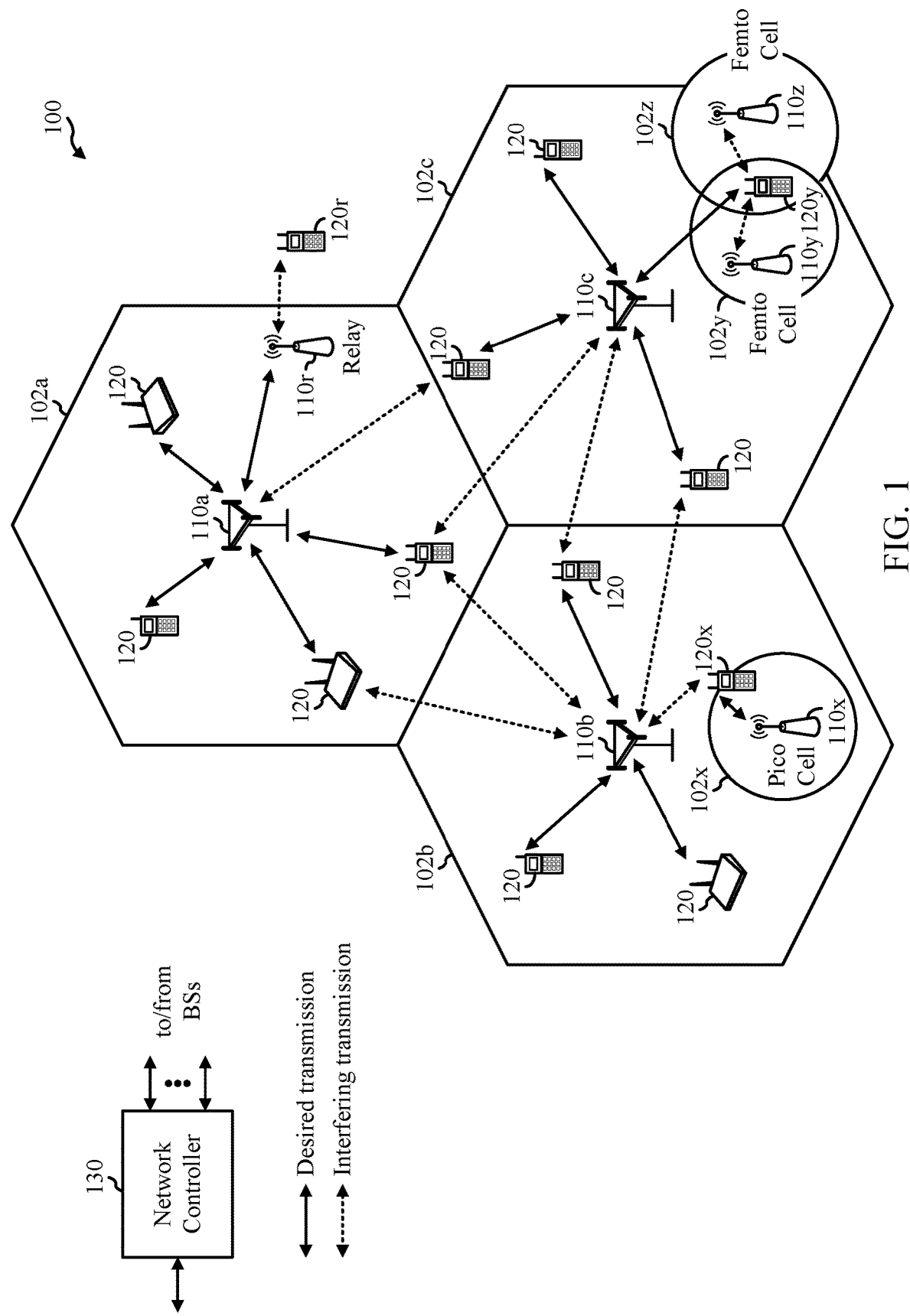
FIG. 1 is a block diagram conceptually illustrating an example telecommunications system, in accordance with certain aspects of the present disclosure.

Aspects of the present disclosure provide apparatus, methods, processing systems, and computer readable mediums for new radio (NR) (new radio access technology or 5G technology).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

NR may support various wireless communication services, such as Enhanced mobile broadband (eMBB) targeting wide bandwidth (e.g. 80 MHz beyond), millimeter wave (mmW) targeting high carrier frequency (e.g. 60 GHz), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe.

Certain multi-beam wireless systems, such as mmW systems, bring gigabit speeds to cellular networks, due to availability of large amounts of bandwidth. However, the unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited during the RACH.

In such systems, the node B (NB) and the user equipment (UE) may communicate over active beam-formed transmission beams. In order for beamforming to function correctly, the NB may need to monitor beams using beam measurements performed (e.g., based on reference signals transmitted by the NB) and feedback generated at the UE. However, since the direction of a reference signal is unknown to the UE, the UE may need to evaluate several beams to obtain the best Rx beam for a given NB Tx beam. Accordingly, if the UE has to "sweep" through all of its Rx beams to perform the measurements (e.g., to determine the best Rx beam for a given NB Tx beam), the UE may incur significant delay in measurement and battery life impact. Moreover, having to sweep through all Rx beams is highly resource inefficient. Thus, aspects of the present disclosure provide techniques to assist a UE when performing measurements of serving and neighbor cells when using Rx beamforming.

Example Wireless Communications System

Figure 8:
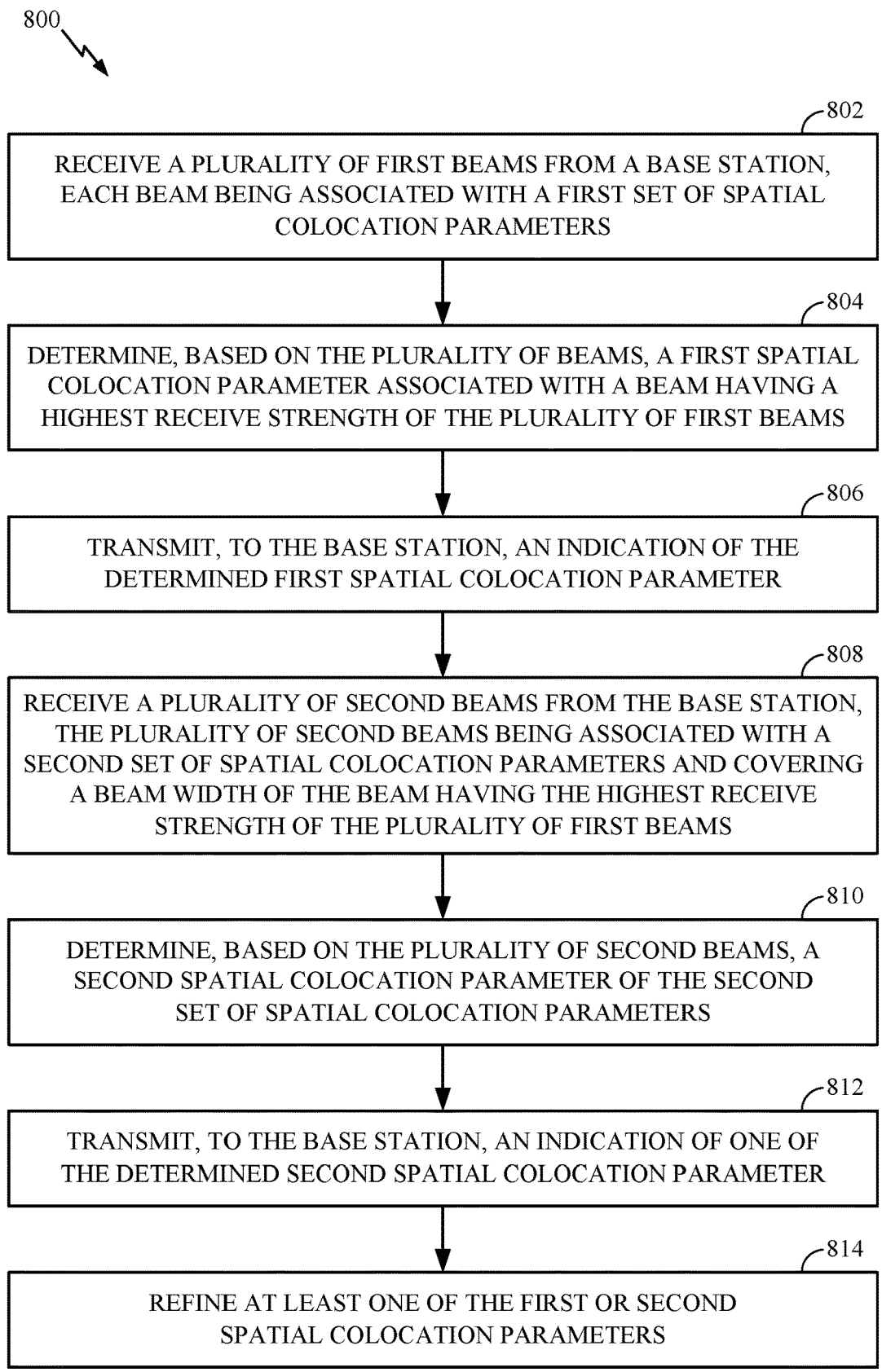
FIG. 8 illustrates an example operation performed by a UE for refining spatial colocation parameters, in accordance with aspects of the present disclosure.

FIG. 1 illustrates an example wireless network 100 in which aspects of the present disclosure may be performed. According to an example, the wireless network may be a NR or 5G network which may support mmW communication. mmW communication depends on beamforming to meet link margin. mmW communication may use directional beamforming, so transmission of signaling is directional. Accordingly, a transmitter may focus transmission energy in a certain narrow direction (e.g., beams may have a narrow angle), as illustrated in FIG. 8. A receiving entity may use receiver beamforming to receive the transmitted signaling.

In order to more efficiently use resources and conserve power when communicating using beamforming, the UEs 120 may be configured to perform the operations 900 and methods described herein for UE receiver beamforming. BS 110 may comprise a transmission reception point (TRP), Node B (NB), 5G NB, access point (AP), new radio (NR) BS, Master BS, primary BS, etc.). The NR network 100 may include the central unit.

As illustrated in FIG. 1, the wireless network 100 may include a number of BSs 110 and other network entities. According to one example, the network entities including the BS and UEs may communicate on high frequencies (e.g., >6 GHz) using beams.

A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110$a$, 110$b$ and 110$c$ may be macro BSs for the macro cells 102$a$, 102$b$ and 102$c$, respectively. The BS 110$x$ may be a pico BS for a pico cell 102$x$. The BSs 110$y$ and 110$z$ may be femto BS for the femto cells 102$y$ and 102$z$, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110$r$ may communicate with the BS 110$a$ and a UE 120$r$ to facilitate communication between the BS 110$a$ and the UE 120$r$. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120$x$, 120$y$, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
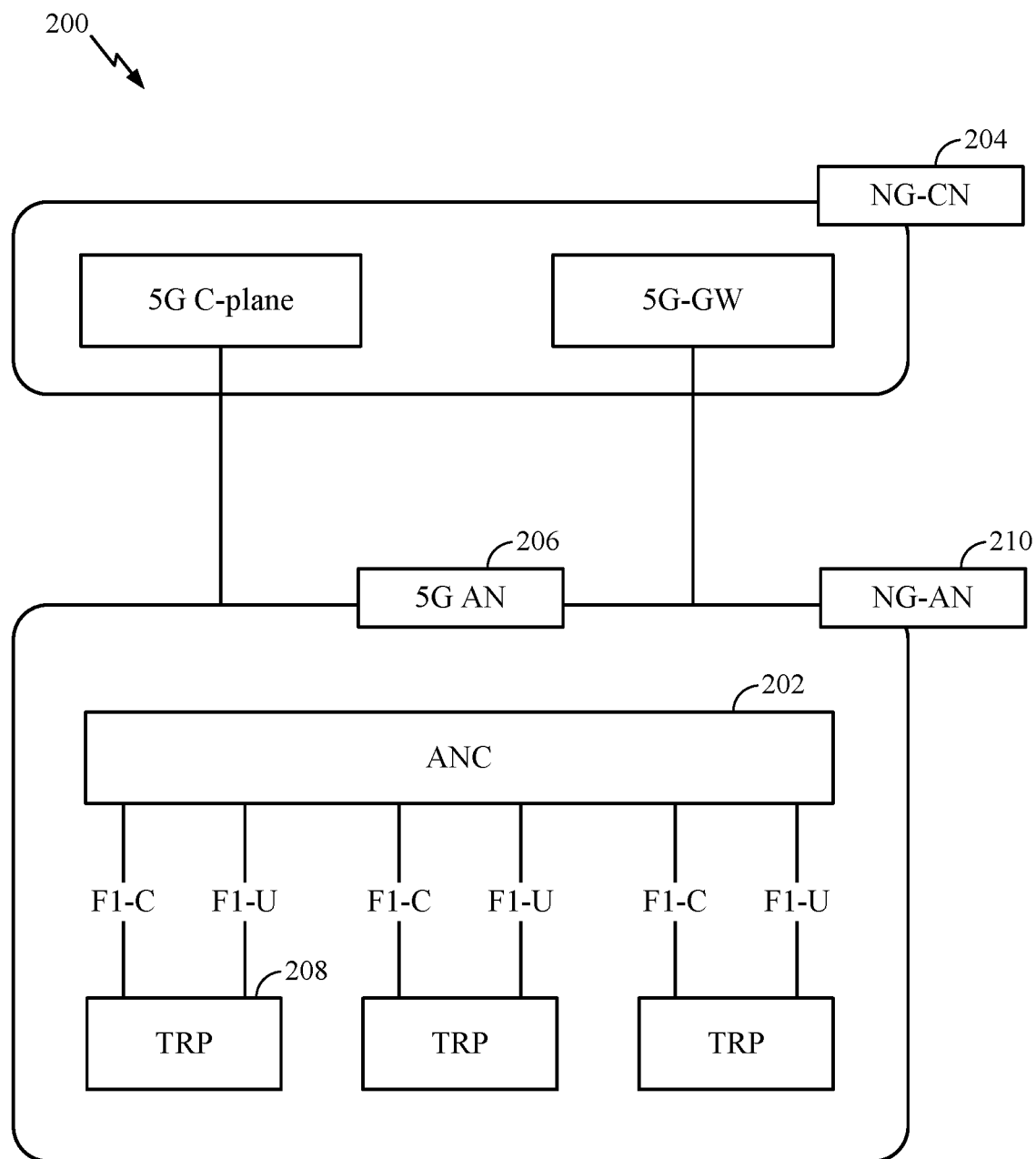
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
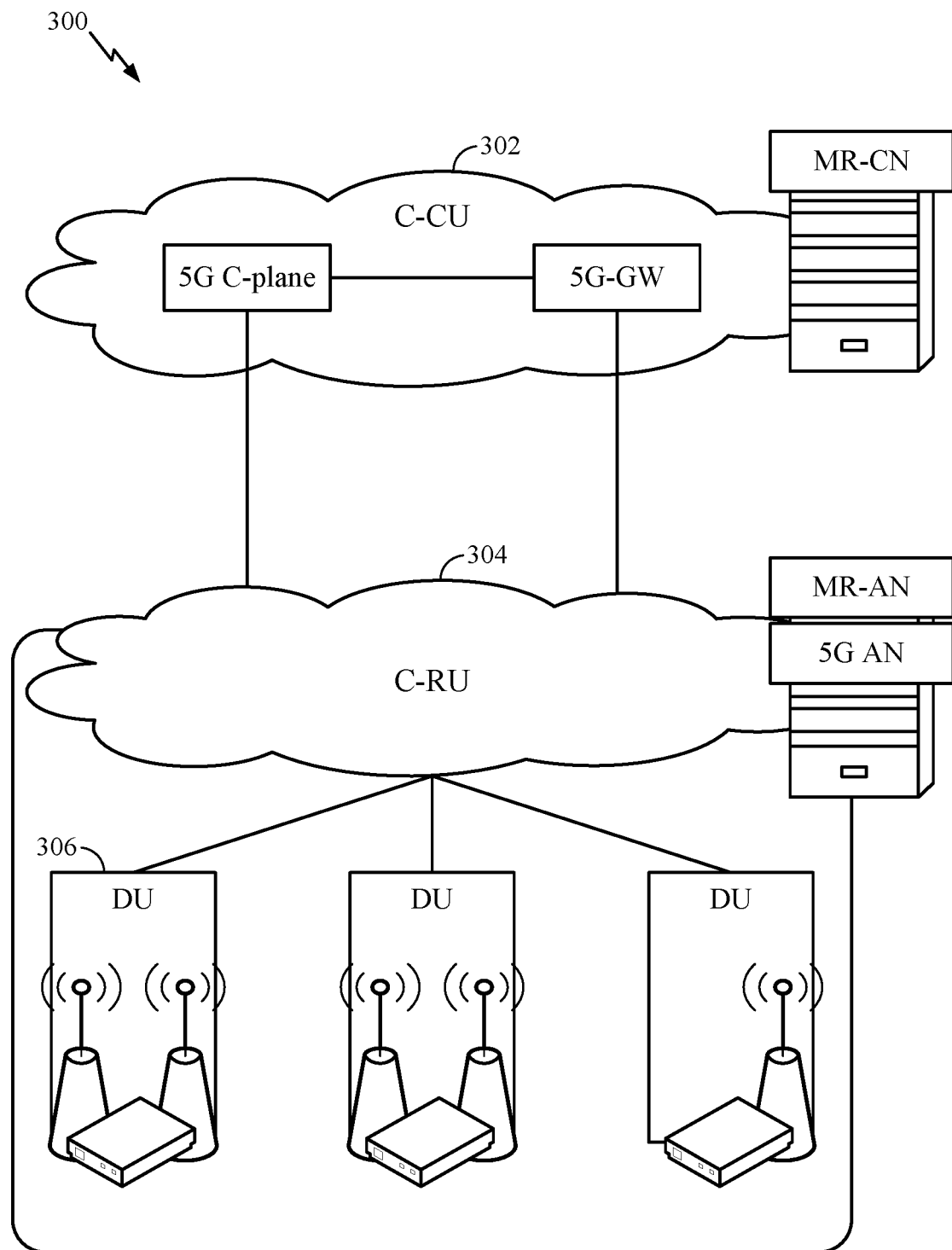
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
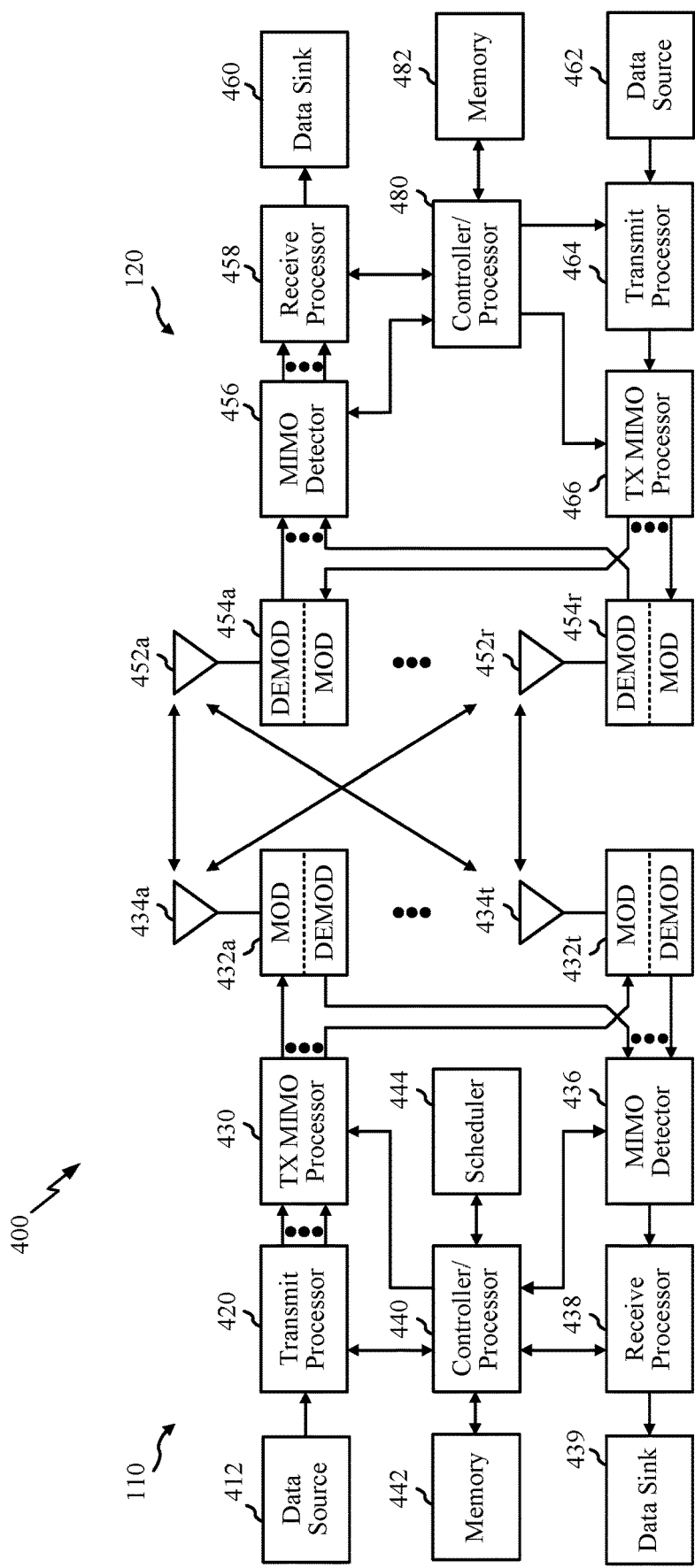
FIG. 4 is a block diagram conceptually illustrating a design of an example BS and UE, in accordance with certain aspects of the present disclosure.

FIG. 4 illustrates example components of the BS 110 and UE 120 illustrated in FIG. 1, which may be used to implement aspects of the present disclosure. The BS may include a TRP or gNB.

According to an example, antennas 452, DEMOD/MOD 454, processors 466, 458, 464, and/or controller/processor 480 of the UE 120 may be used to perform the operations described herein and illustrated with reference to FIGS. 9 and 11-12. According to an example, antennas 434, DEMOD/MOD 432, processors 430, 420, 438 and/or controller/processor 440 of the BS 110 may be used to perform the operations described herein and illustrated with reference to FIGS. 10-12.

As an example, one or more of the antennas 452, DEMOD/MOD 454, processors 466, 458, 464, and/or controller/processor 480 of the UE 120 may be configured to perform the operations described herein for UE beam-based tagging. Similarly, one or more of the 434, DEMOD/MOD 432, processors 430, 420, 438 and/or controller/processor 440 of the BS 110 may be configured to perform the operations described herein.

For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. A scheduler 444 may schedule UEs for data transmission on the downlink and/or uplink. The processor 480 and/or other processors and modules at the UE 120 may perform or direct, e.g., the execution of the functional blocks illustrated in FIG. 9, and/or other processes for the techniques described herein and those illustrated in the appended drawings. The processor 440 and/or other processors and modules at the BS 110 may perform or direct processes for the techniques described herein and those illustrated in the appended drawings. The memories 442 and 482 may store data and program codes for the BS 110 and the UE 120, respectively.

Figure 5:
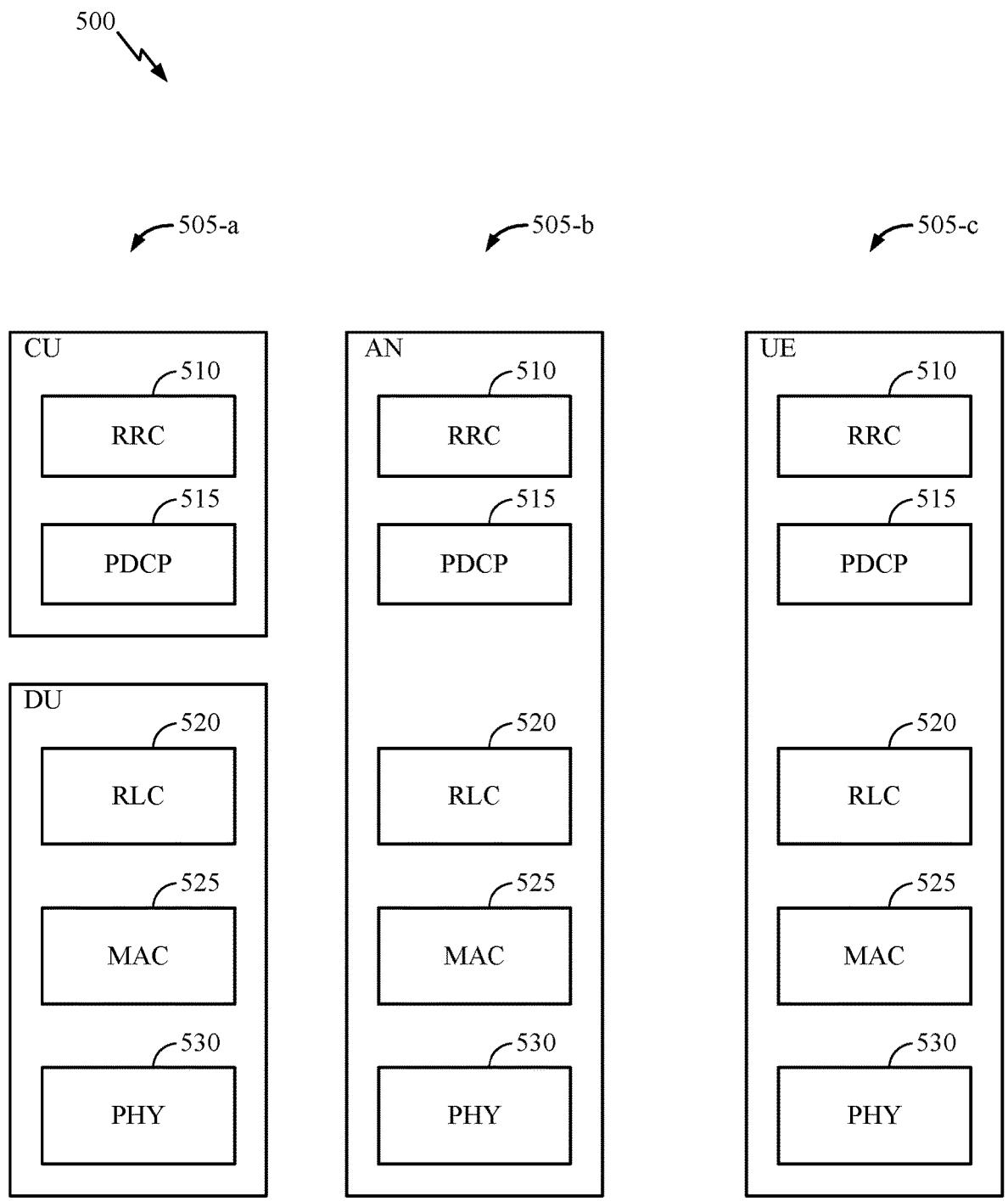
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
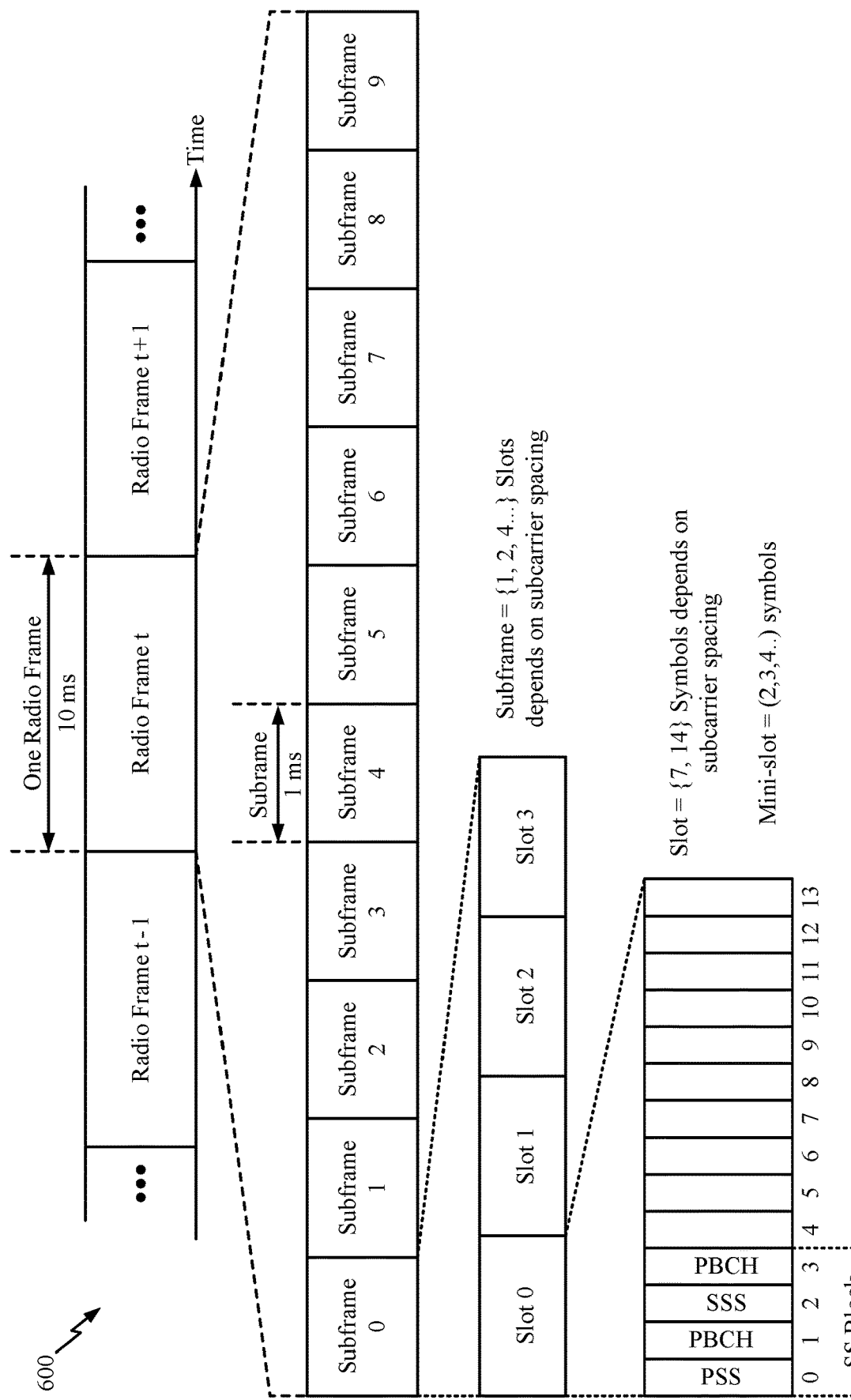
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Beam Refinement Procedure

As noted above, in certain multi-beam systems (e.g., millimeter wave (mmW) cellular systems), beam forming may be needed to overcome high path-losses. As described herein, beamforming may refer to establishing a link between a BS and UE, wherein both of the devices form a beam corresponding to each other. Both the BS and the UE find at least one adequate beam to form a communication link. BS-beam and UE-beam form what is known as a beam pair link. As an example, on the DL, a BS may use a transmit beam and a UE may use a receive beam corresponding to the transmit beam to receive the transmission. The combination of a transmit beam and corresponding receive beam may be referred to as a beam pair link.

As a part of beam management, beams which are used by BS and UE have to be refined from time to time because of changing channel conditions, for example, due to movement of the UE or other objects. Additionally, the performance of a beam pair link may be subject to fading due to Doppler spread. Because of changing channel conditions over time, the beam pair link should be periodically updated or refined. Accordingly, it may be beneficial if the BS and the UE monitor beams and new beam pair links.

At least one beam pair link may need to be established for network access. As described above, new beam pair links may need to be discovered later for different purposes. For example, the network may decide to use different beam pair links for different channels, or for communicating with different BSs (TRPS) or as fallback beam pair links in case an existing beam pair link fails. Typically, the UE monitors the quality of one or more beam pair links, and the network may refine one or more beam pair links from time to time.

Figure 7:
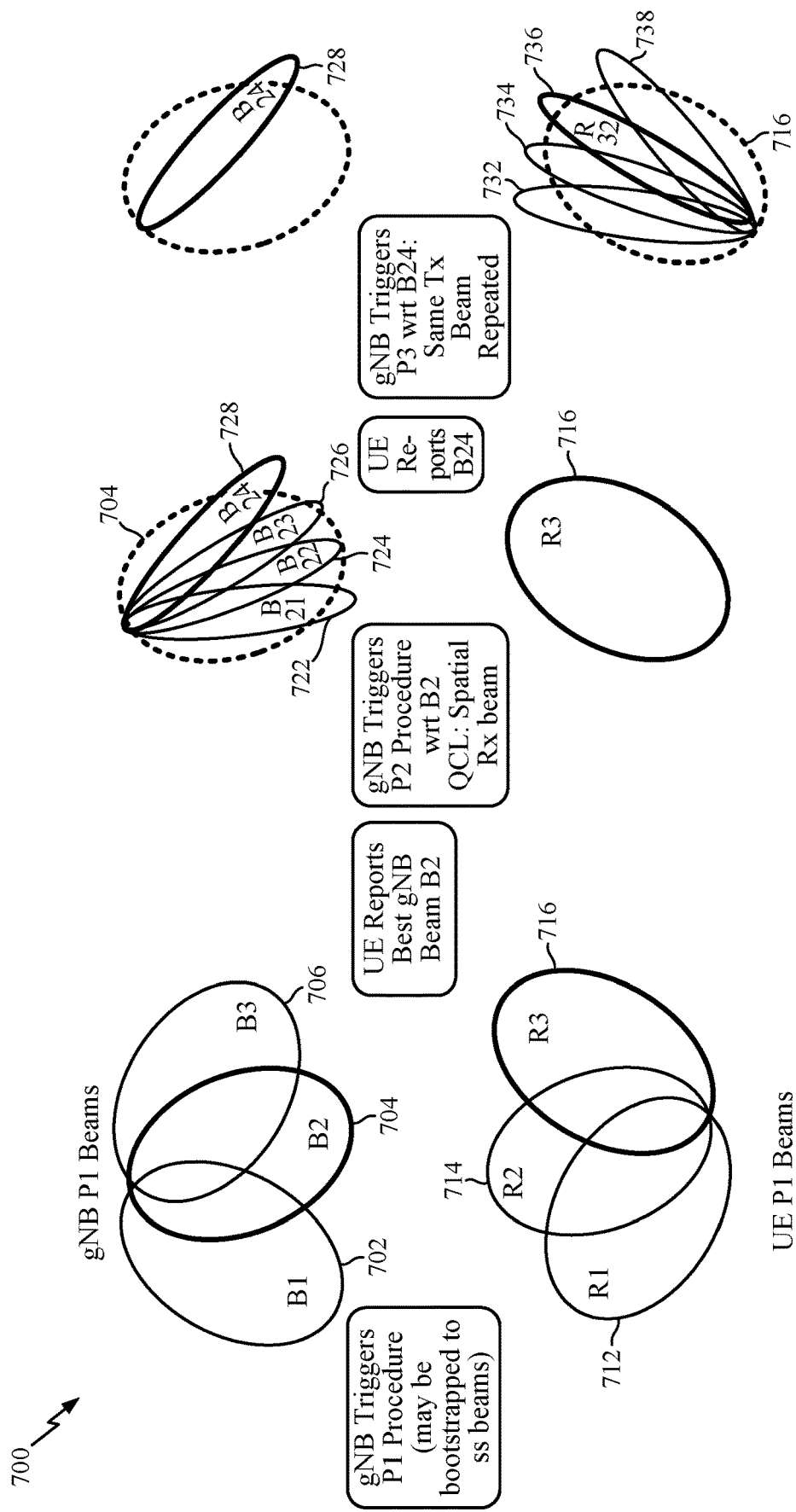
FIG. 7 illustrates an example of a P1, P2, and P3 procedure, in accordance with certain aspects of the present disclosure.

FIG. 7 illustrates example 700 for beam pair link discovery and refinement. In 5G-NR, the P1, P2, and P3 procedures are used for beam pair link discovery and refinement. The network uses a P1 procedure to enable the discovery of new beam pair links. In the P1 procedure, as illustrated in FIG. 7, the BS transmits different symbols of a reference signal (e.g., by configuration of CSI-RS resources including CSI-RS ports) using a plurality of coarse transmit beams (e.g., coarse transmit beams 702, 704, and 706). Each of coarse transmit beams 702, 704, and 706 (and other coarse transmit beams used by the BS to transmit different symbols of a reference signal) are generally formed in a different spatial direction such that several (most, all) relevant places of the cell are reached. Stated otherwise, the BS transmits symbols of a reference signal using different transmit beams over time in different directions.

For successful reception of at least a symbol of this "P1-signal", the UE has to find an appropriate receive beam. The UE searches using available receive beams (e.g., coarse receive beams 712, 714, and 716) and applies a different UE-beam during each occurrence of the periodic P1-signal.

Once the UE has succeeded in receiving a symbol of the P1-signal, the UE has discovered a beam pair link. For example, as illustrated in FIG. 7, the UE may determine a beam pair link of coarse transmit beam 704 from the BS and coarse receive beam 716 at the UE and may report this information implicitly or explicitly to the BS. The UE may not want to wait until it has found the best UE receive beam, since this may delay further actions. The UE may measure the reference signal receive power (RSRP) and report the symbol index together with the RSRP to the BS. Such a report will typically contain the findings of one or more beam pair links.

In an example, the UE may identify a received signal having a high RSRP. The UE may not know which beam the BS used to transmit; however, the UE may report to the BS the time at which it observed the signal having a high RSRP. The BS may receive this report and may determine which BS beam the BS used at the given time.

The BS may then offer P2 and P3 procedures to refine an individual beam pair link. The P2 procedure refines the BS-beam of a beam pair link (e.g., using one or more narrow beams within the beam width of coarse transmit beam 704 identified in the P1 procedure). The BS may transmit a few symbols of a reference signal with different BS-beams, such as narrow BS beams 722, 724, 726, 728 within the beam width of coarse beam 704, that are spatially close to the BS-beam of the beam pair link (e.g., by performing a sweep using neighboring beams around the selected beam). In P2, the UE keeps its beam constant. Thus, while the UE uses the same beam as in the beam pair link (as illustrated in P2 procedure in FIG. 8). The BS-beams used for P2 may be different from those for P1 in that they may be spaced closer together or they may be more focused. The UE may measure the RSRP for the various BS-beams and indicate the best one to the BS.

The P3 procedure refines the UE-beam of a beam pair link (see P3 procedure in FIG. 7). While the BS-beam stays constant, the UE scans using different receive beams (the UE performs a sweep using neighboring beams) to determine a receive beam direction for receiving signals from the BS. The different receive beams, such as narrow receive beams 732, 734, 736, 738 illustrated in FIG. 7, may be within the beam width of coarse receive beam 716 identified in the P1 procedure. The UE may measure the RSRP of each beam and identify or determine the best UE-beam (e.g., one of narrow receive beams 732, 734, 736, and 738 as illustrated in FIG. 7) for receiving signals from the BS. Afterwards, the UE may use the determined best UE-beam for the beam pair link and report the RSRP to the BS.

Over time, the BS and UE may establish several beam pair links. When the BS transmits a certain channel or signal, it lets the UE know which beam pair link will be involved, such that the UE may tune in the direction of the correct UE receive beam before the signal starts. In this manner, every sample of that signal or channel may be received by the UE using the correct receive beam. In an example, the BS may indicate for a scheduled signal (SRS, CSI-RS) or channel (PDSCH, PDCCH, PUSCH, PUCCH) which beam pair link is involved. In NR this information is generally referred to as a quasi-colocation (QCL) indication.

Two antenna ports are quasi-colocated if properties of the channel over which a symbol on one antenna port is conveyed may be inferred from the channel over which a symbol on the other antenna port is conveyed. Quasi-colocation supports, at least, beam management functionality, frequency/timing offset estimation functionality, and RRM management functionality.

The BS may use a beam pair link which the UE has received in the past. The transmit beam for the signal to be transmitted and the previously-received signal both point in a same direction or are quasi-colocated. The quasi-colocation (QCL) indication may be needed by the UE (in advance of signal to be received) such that the UE may use a correct receive beam for each signal or channel. Some QCL indications may be needed from time to time when the beam pair link for a signal or channel changes and some QCL indications are needed for each scheduled instance. The QCL indication may be transmitted in the downlink control information (DCI) which may be part of the PDCCH channel. Because DCI is needed to control the information, it may be desirable to use a small number of bits for the QCL indication. The QCL may be transmitted in a medium access control (MAC) control element (CE) (MAC-CE) or radio resource control (RRC) message.

According to one example, whenever the UE reports a BS beam that it has received with sufficient RSRP, and the BS decides to use this beam pair link in the future, the BS assigns the beam pair link a beam pair link tag. Accordingly, two beam pair links having different BS beams may be associated with different beam pair link tags. Beam pair links that are based on the same BS beams may be associated with the same beam pair link tag. Thus, according to this example, the tag is a function of the BS beam of the beam pair link.

Example Spatial Colocation Parameter Indication

Certain wireless systems, such as millimeter wave (mmW) systems, bring gigabit speeds to cellular networks due to availability of large amounts of bandwidth. However, the unique challenges of heavy path-loss faced by such wireless systems necessitate new techniques such as hybrid beamforming (analog and digital), which are not present in 3G and 4G systems. Hybrid beamforming may enhance link budget/signal to noise ratio (SNR) that may be exploited during the RACH procedure.

In mmW systems, the node B (NB) and the user equipment (UE) may communicate over actively beam-formed transmission beams. Actively beam-formed transmission beams may be considered paired transmission (Tx) and reception (Rx) beams between the NB and UE that carry data and control channels such as PDSCH, PDCCH, PUSCH, and PUCCH.

Signaling of spatial quasi-colocation relationships may be used for beam management and tracking. Spatial reception parameters for quasi-colocation relationships may include receive beam pointing directions, received beam width at a UE, expected beam angle of arrival at a UE, dominant beam angle of arrival, average beam angle of arrival, expected beam angular spread of a channel at a UE, power angular spread (PAS), transmit/receive channel correlation, transmit/receive channel correlation, transmit/receive beamforming, spatial channel correlation, average gain, average delay, delay spread, Doppler shift, Doppler spread, and the like. A UE may be indicated to receive a signal from a first port based on a spatial quasi-colocation relationship with respect to a set of spatial receive parameters for quasi-colocation used to receive a signal from a second port. However, the indication to receive a signal on a first port based on spatial reception parameters for quasi-colocation used to receive a signal on a second port may not consistently allow for beam refinement.

To allow for consistent beam management and tracking, an NB may indicate to a UE that spatial reception parameters for quasi-colocation may be derived from more than one set of port groups. In some aspects, the spatial reception parameters for quasi-colocation may be derived from different port groups transmitted at different instances in time. In some aspects, spatial reception parameters for quasi-colocation may be derived from two or more port groups at the same time or different times. A first spatial quasi-colocation parameter may be derived from a first port group, and a second quasi-colocation parameter may be derived from a second port group. For example, a UE may derive a beam width from a CSI-RS P1 beam, which may be transmitted at a first time, and may derive a pointing angle (expected angle of arrival) from CSI-RS P2 and/or P3 beams, which may be transmitted at a second time (e.g., after transmission of the CSI-RS P1 beam).

FIG. 8 illustrates example operations 800 for wireless communications. According to certain aspects, operations 800 may be performed by a user equipment (e.g., UE 120) for example to refine spatial colocation parameters (e.g., a beam pair link) for communications between a UE and a base station. As illustrated, operations 800 may begin at 802, where a UE receives a plurality of first beams from a base station. Each beam of the first plurality beams may be associated with a first set of spatial colocation parameters, such as beam angle of arrival, angular spread, and the like. Each beam of the first plurality of beams may have been transmitted from the base station in a plurality of coarse directions, and the plurality of beams may correspond to the P1 beams discussed above.

At 804, the UE determines, based on the plurality of first beams, a first spatial colocation parameter. The determined first spatial colocation parameter may, for example, be associated with a beam of the plurality of first beams having a highest receive strength of the plurality of first beams. As discussed, the first spatial colocation parameter may include a beam width, a beam angular spread, and so on. At 806, the UE transmits, to the base station, an indication of the determined first spatial colocation parameter.

At 808, the UE receives a plurality of second beams from the base station associated with a second set of spatial colocation parameters. The plurality of second beams may include a plurality of beams that cover a beam width of the beam of the first plurality of beams having a highest receive strength of the plurality of beams. In some embodiments, the plurality of second beams may have a narrower beam width than that of the plurality of first beams. In some aspects, the plurality of second beams may correspond to the P2/P3 beams discussed above.

At 810, the UE determines, based on the plurality of second beams, a second spatial colocation parameter. The determined second colocation parameter may be associated with a beam of the plurality of second beams having a highest receive strength of the second plurality of beams. For example, the UE may determine an expected angle of arrival based on the plurality of second beams. At 812, the UE transmits, to the base station, an indication of the determined second spatial colocation parameter. For example, the UE may transmit an indication of the beam of the plurality of second beams having a highest receive strength of the plurality of second beams. In some embodiments, the UE may transmit quasi-colocation indication signaling to the UE based on the indicated one of the plurality of second beams and the determined beam direction.

At 814, the UE refines at least one of the first or second spatial colocation parameters. In some aspects, the UE may refine at least one of the first or second spatial colocation parameters in response to a refinement procedure trigger received from a base station. As discussed in further detail below, the refinement procedure trigger may initiate a beam refinement procedure with respect to a beam width of the beam associated with the indicated coarse direction and a beam angle from the indicated narrow beams.

Figure 9:
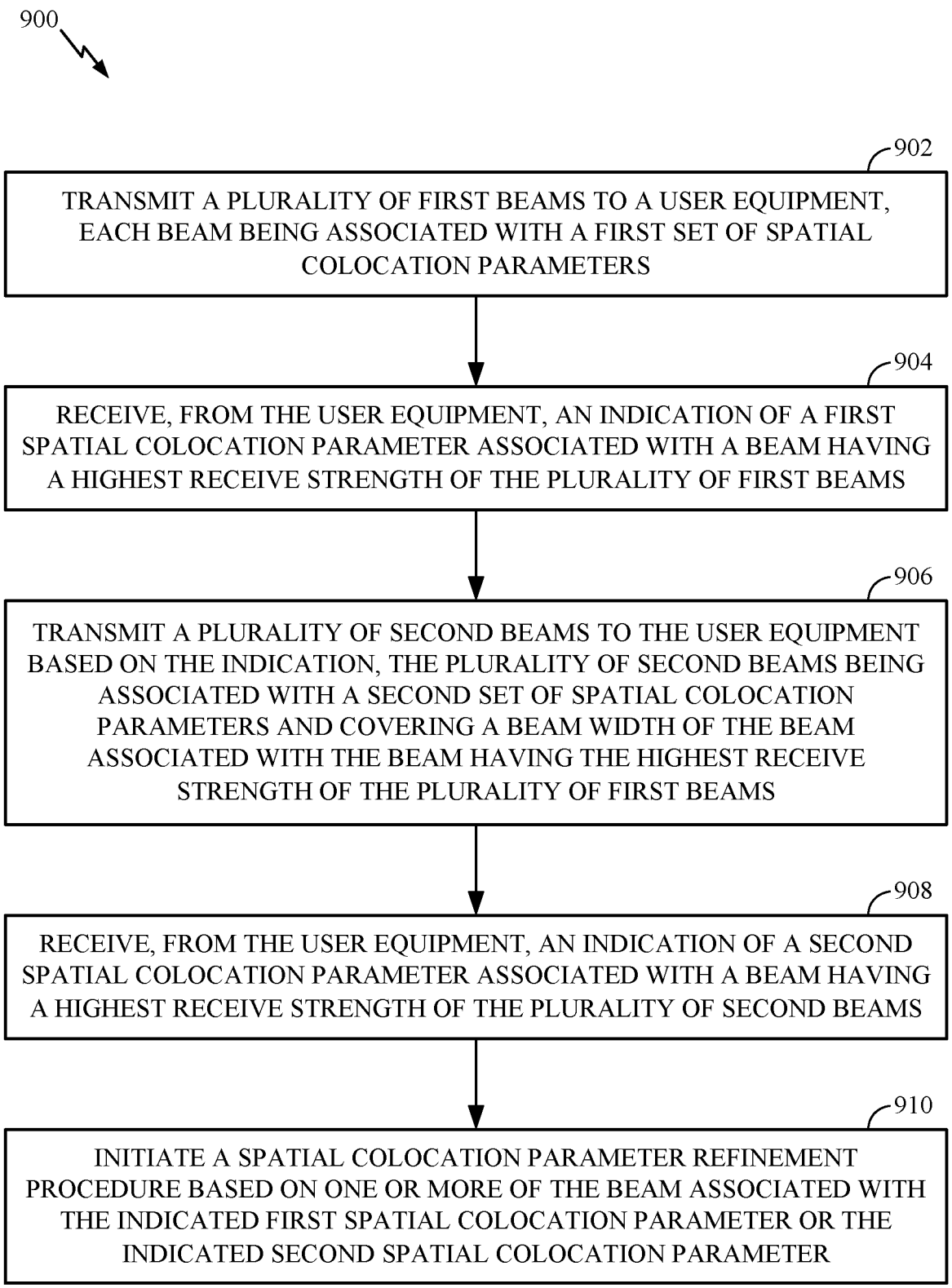
FIG. 9 illustrates an example operation performed by a base station for refining spatial colocation parameters, in accordance with aspects of the present disclosure.

FIG. 9 illustrates example operations 900 for wireless communications. According to certain aspects, operations 900 may be performed by a base station (e.g., base station 110) for example to refine spatial colocation parameters (e.g., a beam pair link) for communications between a UE and a base station. As illustrated, operations 900 may begin at 902, where a base station transmits a plurality of first beams to a UE. The beams of the plurality of first beams may be associated with a first set of spatial colocation parameters Each beam may be transmitted from the base station in a plurality of coarse directions, and the plurality of beams may correspond to the P1 beams discussed above.

At 904, the base station receives, from the UE, an indication of a first spatial colocation parameter. The first spatial colocation parameter may be associated with a beam of the plurality of first beams having a highest receive strength of the plurality of first beams. In some embodiments, the first spatial colocation parameter may include an angle of arrival of the beams, an angular spread from one or more beams, and the like. At 906, the base station transmits a plurality of second beams to the UE based on the indication. The plurality of second beams may be associated with a second set of spatial colocation parameters. In some embodiments, each beam of the plurality of second beams may have a narrower beam width than the plurality of coarse beams, and the plurality of second beams may cover a beam width associated with the beam associated with the indicated coarse direction. At 908, the base station receives, from the UE, an indication of a second spatial colocation parameter of the second set of spatial colocation parameters associated with a beam of the plurality of second beams having a highest receive strength of the plurality of second beams. At 910, the base station initiates a spatial colocation parameter refinement procedure based on one or more of the beam associated with the indicated first spatial colocation parameter or the indicated second spatial colocation parameter.

Figure 10:
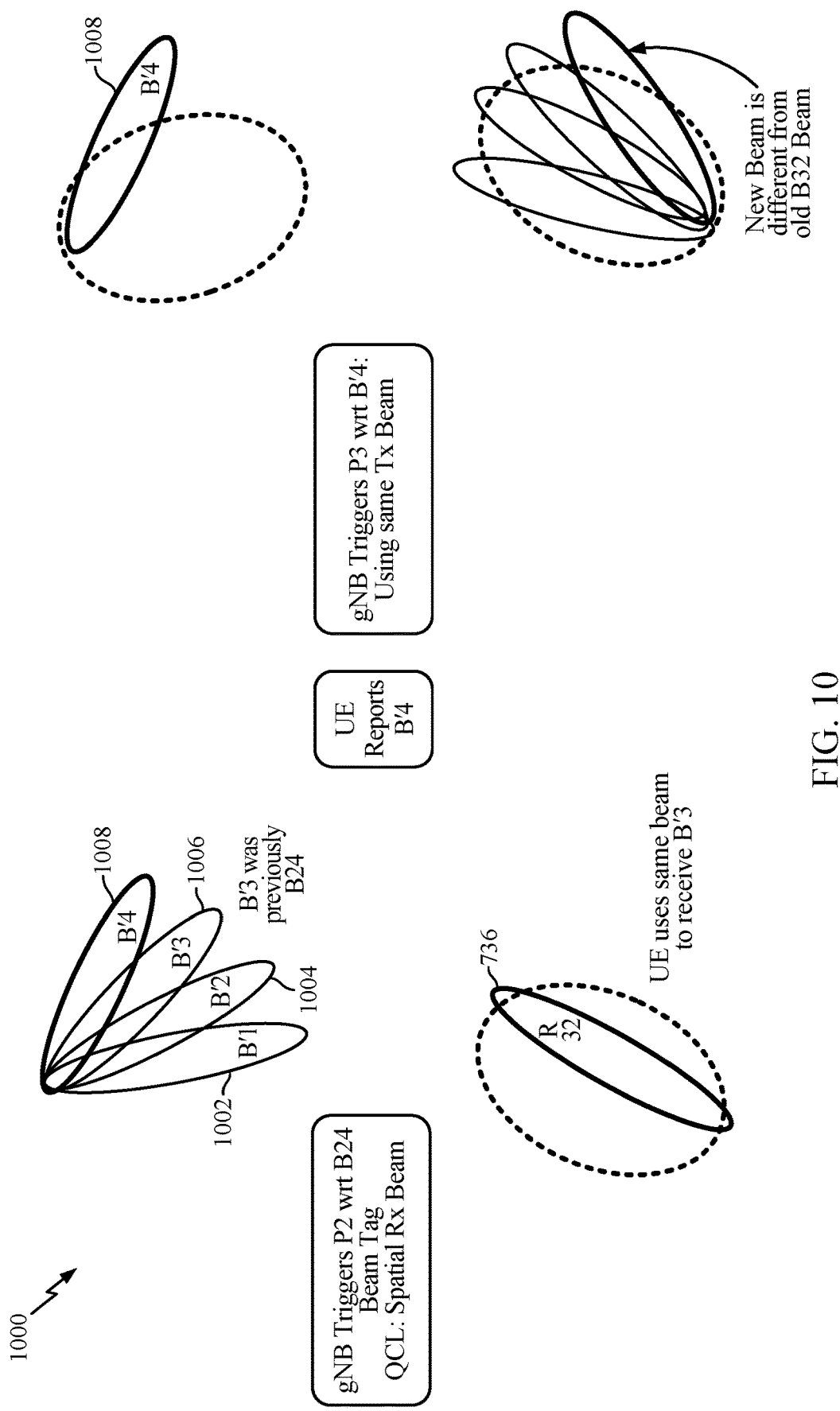
FIG. 10 illustrates an example spatial colocation refinement procedure, in accordance with certain aspects of the present disclosure.

Over time, as discussed above, spatial colocation parameters may be refined, or updated, to account for changes in channel conditions between a base station and a UE. In updating the spatial colocation parameters, the P2 and/or P3 procedures may be performed based on the coarse directions identified in a previously performed P1 procedure. FIGS. 10-12 illustrate various techniques by which spatial colocation parameters may be updated.

FIG. 10 illustrates an example spatial colocation parameter refinement procedure, according to an aspect. In this example, a UE may have identified a beam link pair of beams B24 (BS-beam 728) and R32 (UE-beam 736), as illustrated in FIG. 7. To refine the spatial receive parameters for quasi-colocation, the UE may use the same beam to receive one or more second beams (e.g., the P2/P3 beams) from a base station. As illustrated, the base station may trigger a spatial colocation parameter refinement procedure by triggering a P2 procedure with respect to beam B24 (i.e., BS-beam 728 previously reported by the UE as the beam having a highest signal receive strength). In the P2 procedure illustrated, the base station may transmit a plurality of third beams, such as beams 1002, 1004, 1006, 1008, designated B'1, B'2, B'3, and B'4, respectively, to the UE. The UE may determine one or more spatial colocation parameters from the plurality of third beams. The UE may also report a strongest beam of the plurality of third beams (as illustrated, beam 1008, designated as B'4) to the base station and identify a new beam pairing for communicating with the base station.

In the example illustrated above, the channel may have changed from when the UE identified the spatial colocation parameters and beam pair link as illustrated in FIG. 7. In some cases, due to changes in channels, the UE may be unable to receive the plurality of third beams (i.e., may be unable to receive beams B'1, B'2, B'3, and B'4), and thus, may be unable to refine the spatial colocation parameters for communicating with the base station. In such a case, a beam pair link discovery process may be performed to establish a new beam pair link between the UE and the base station.

Figure 11:
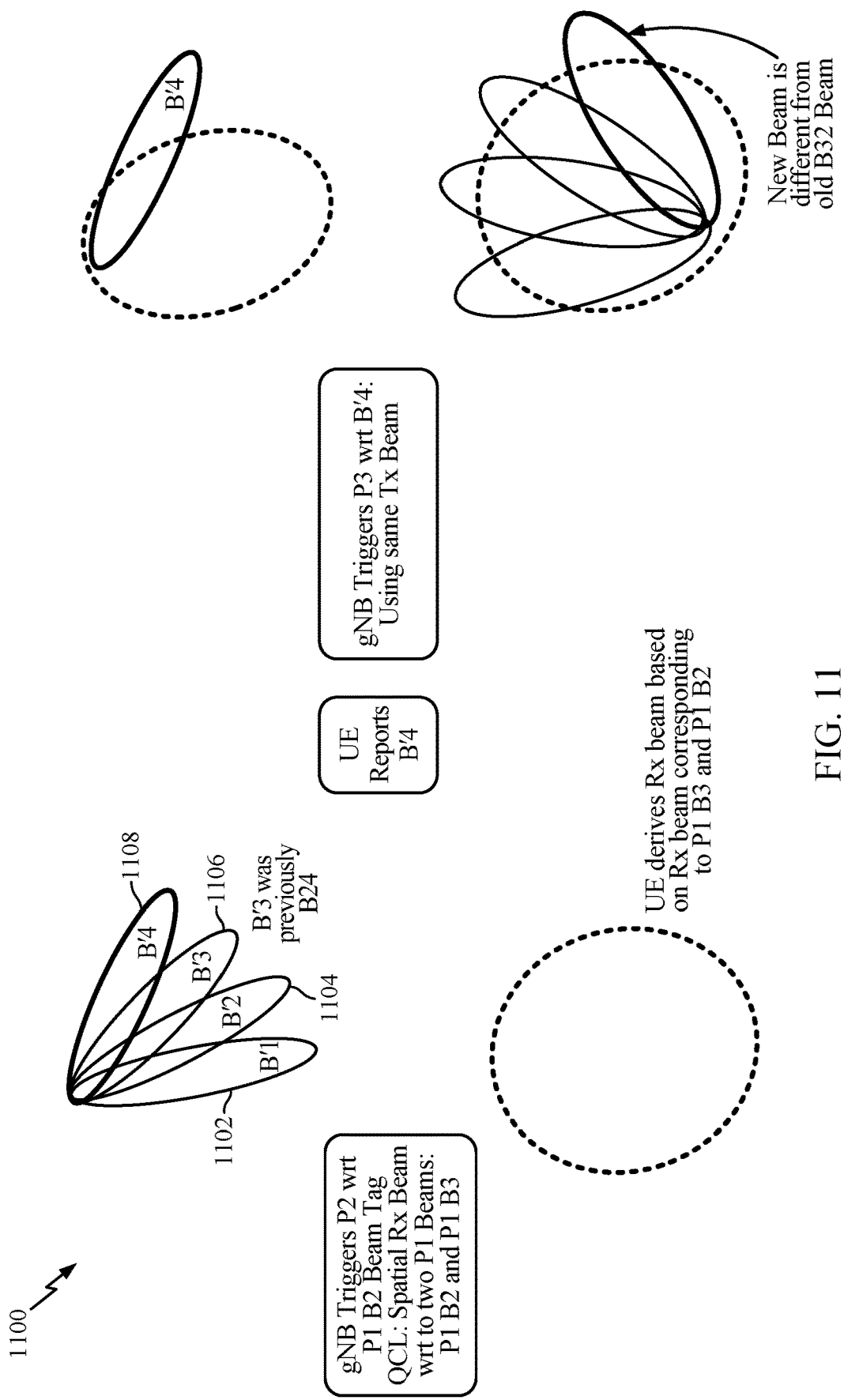
FIG. 11 illustrates an example spatial colocation refinement procedure, in accordance with certain aspects of the present disclosure.

FIG. 11 illustrates an example spatial colocation parameter refinement procedure using multiple beams, according to an aspect. As illustrated, the base station may trigger a spatial colocation refinement procedure (e.g., a P2 procedure) based on a plurality of P1 beams. The plurality of P1 beams, in some aspects, may include the previously reported P1 beam (e.g., coarse beam 704 designated as beam B2 as illustrated in FIG. 7 and one or more adjacent beams, such as coarse beams 702 or 706). The base station may trigger a P2 procedure, as illustrated, and transmit a plurality of third narrow beams 1102, 1104, 1106, 1108, designated B'1, B'2, B'3, and B'4, respectively, to the UE. In response, the UE may determine one or more spatial colocation parameters from the plurality of third beams, report a strongest beam of the plurality of third beams to the base station, and identify a new beam pairing for communicating with the base station. For example, as illustrated in FIG. 11, the UE can identify narrow beam 1108, designated as beam B'4, as the strongest beam of the plurality of third beams, report the identification of narrow beam 1108 to the base station in response to the P2 procedure triggered by the base station based on a plurality of P1 beams. In response, the base station can trigger a P3 procedure based on the identification of narrow beam 1108 as the BS-beam to refine the selection of the UE beam.

In some cases, the union of beams at the UE may have a wider beam width. In the example illustrated in FIG. 10, the UE may receive the plurality of third beams at a low energy. Additionally, the use of multiple P1 beam tags may increase memory usage at the UE, as the base station may indicate a plurality of P1 beams from any potential set.

Figure 12:
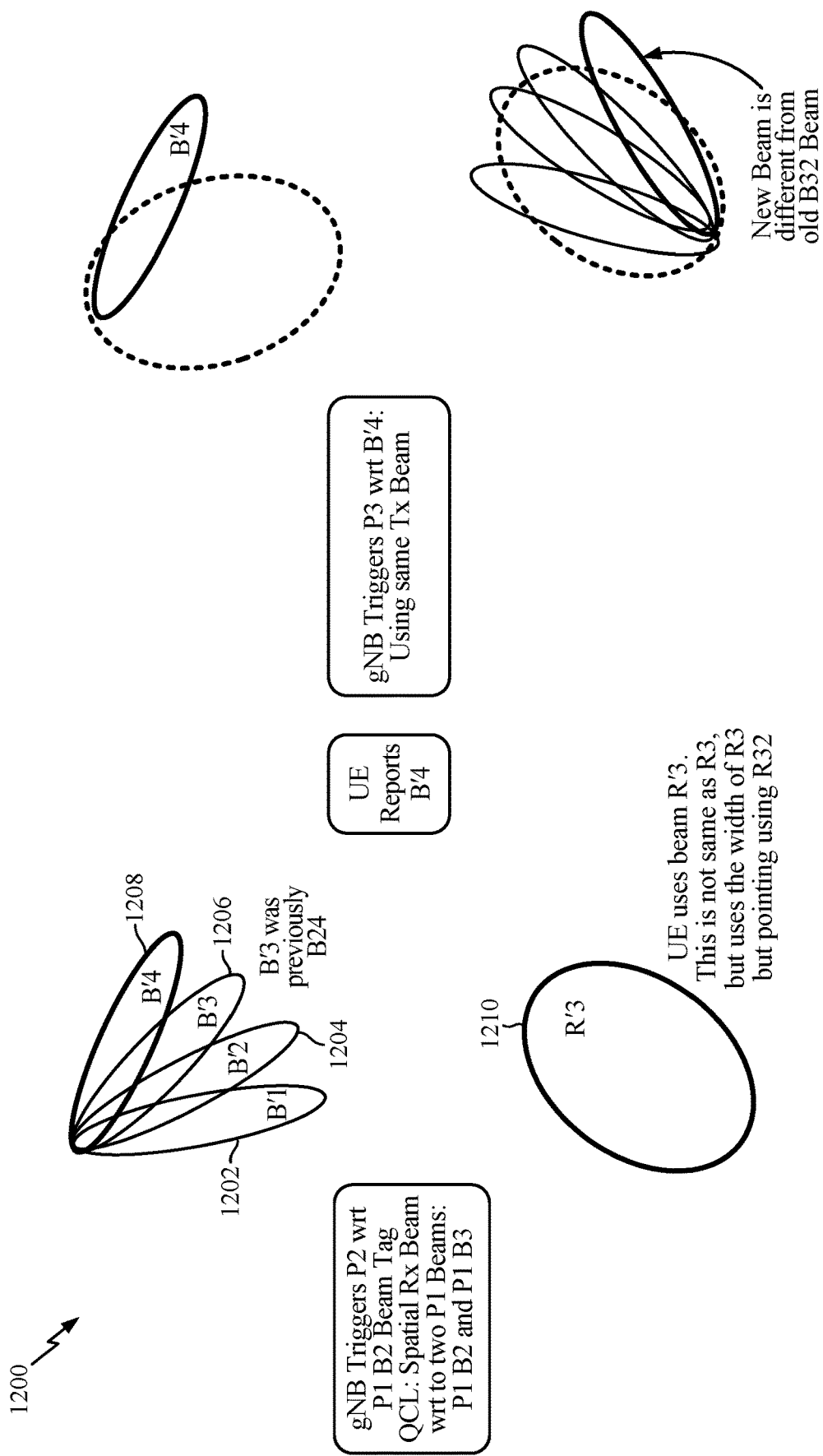
FIG. 12 illustrates an example spatial colocation refinement procedure, in accordance with certain aspects of the present disclosure.

FIG. 12 illustrates an example spatial colocation parameter refinement procedure using multiple beams, according to an aspect. As illustrated, the UE may derive and refine spatial receive parameters for quasi-colocation from a plurality of P1 beams based on different subsets of spatial receive parameters for quasi-colocation from different beams. The base station may trigger a P2 procedure with respect to a plurality of P1 beams, and the UE may receive the P2 beams 1202, 1204, 1206, 1208 from the base station using a new coarse beam 1210, designated as beam R'3. Beam R'3 may have a beam width of the R3 beam illustrated in FIG. 7 (e.g., a beam width based on the first spatial quasi-colocation parameter) and a beam direction based on the previously-identified best receive beam direction (e.g., a beam direction based on the second spatial quasi-colocation parameter). The UE may determine one or more spatial colocation parameters from the plurality of third beams, report a strongest beam of the plurality of third beams to the base station, and identify a new beam pairing for communicating with the base station. By indicating quasi-colocation using a subset of spatial receive parameters for quasi-colocation from a first beam and a subset of spatial receive parameters for quasi-colocation from a second beam, beam tracking performance may be improved.

The quasi-colocation indication may be transmitted by the base station using Radio Resource Control (RRC) signaling. The quasi-colocation indication may, in some aspects, be transmitted by the base station using downlink control information (DCI) signaling. In some aspects, quasi-colocation information may be transmitted by the base station in one or more Media Access Control (MAC) control elements (CEs).

Figure 13:
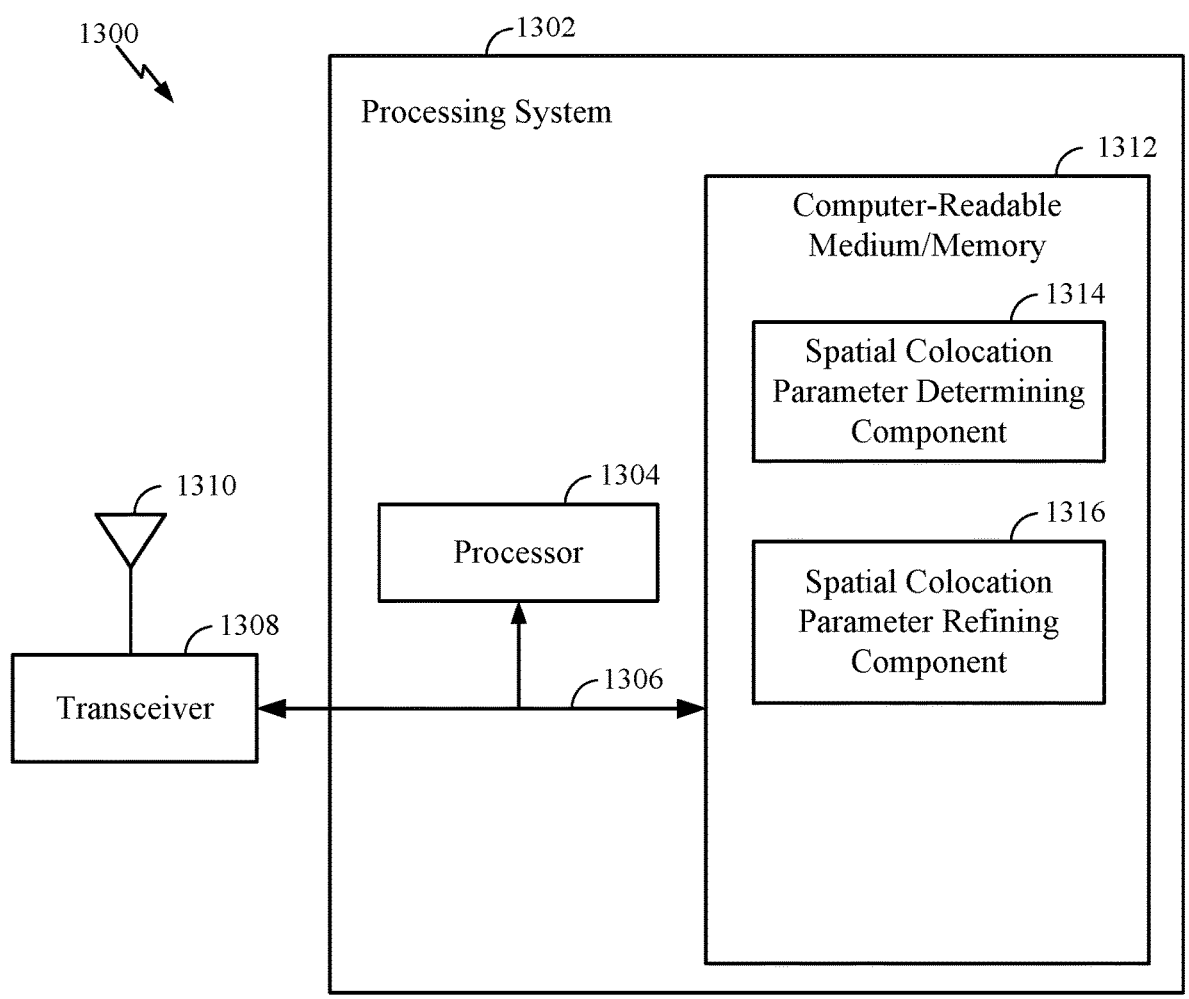
FIG. 13 illustrates a communications device that may include various components configured to perform operations for the techniques disclosed herein in accordance with aspects of the present disclosure.

FIG. 13 illustrates a communications device 1300 that may include various components (e.g., corresponding to means-plus-function components) configured to perform operations for the techniques disclosed herein, such as the operations illustrated in FIGS. 7-12. The communications device 1300 includes a processing system 1302 coupled to a transceiver 1308. The transceiver 1308 is configured to transmit and receive signals for the communications device 1300 via an antenna 1310, such as the various signal described herein. The processing system 1302 may be configured to perform processing functions for the communications device 1300, including processing signals received and/or to be transmitted by the communications device 1300.

The processing system 1302 includes a processor 1304 coupled to a computer-readable medium/memory 1312 via a bus 1306. In certain aspects, the computer-readable medium/memory 1312 is configured to store instructions that when executed by processor 1304, cause the processor 1304 to perform the operations illustrated in FIG. 7-12, or other operations for performing the various techniques discussed herein.

In certain aspects, the processing system 1302 further includes a spatial colocation parameter determining component 1314 for performing the operations illustrated in FIGS. 7-12. Additionally, the processing system 1302 includes a spatial colocation parameter refining component 1316 for performing the operations illustrated in FIGS. 7-12. The spatial colocation parameter determining component 1314 and spatial colocation parameter refining component 1316 may be coupled to the processor 1304 via bus 1306. In certain aspects, the spatial colocation parameter determining component 1314 and spatial colocation parameter refining component 1316 may be hardware circuits. In certain aspects, the spatial colocation parameter determining component 1314 and spatial colocation parameter refining component 1316 may be software components that are executed and run on processor 1304.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein and the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications by a user equipment (UE), comprising:
receiving a plurality of first beams from a base station, each beam of the plurality of first beams being associated with a first set of spatial colocation parameters;
determining, based on the plurality of first beams, a first spatial colocation parameter of the first set of spatial colocation parameters, wherein the determined spatial colocation parameter is associated with a beam of the plurality of first beams having a highest receive strength of the plurality of first beams;
transmitting, to the base station, an indication of the determined first spatial colocation parameter;
receiving a plurality of second beams from the base station based on the indication, the plurality of second beams being associated with a second set of spatial colocation parameters, wherein the plurality of second beams covers a beam width of the beam associated with the beam of the plurality of first beams having a highest receive strength of the plurality of first beams;
determining, based on the plurality of second beams, a second spatial colocation parameter of the second set of spatial colocation parameters wherein the second spatial colocation parameter is associated with a beam of the plurality of second beams having a highest receive strength of the plurality of second beams;
transmitting, to the base station, an indication of the determined second spatial colocation parameter; and
refining at least one of the first or second spatial colocation parameters.

2. The method of claim 1, wherein the first spatial colocation parameter comprises a beam width.

3. The method of claim 1, wherein the first spatial colocation parameter comprises an expected beam angular spread.

4. The method of claim 1, wherein the second spatial colocation parameter comprises an expected beam angle of arrival.

5. The method of claim 1, wherein refining at least one of the first or second spatial colocation parameters comprises:
receiving, from the base station, a trigger indicating beam refinement with respect to a beam width from the beam associated with the determined first spatial colocation parameter and a beam angle associated with the determined second spatial colocation parameter and a plurality of third beams;
updating at least one of the first or second spatial colocation parameters based on the plurality of third beams; and
transmitting, to the base station, an indication of one of the plurality of third beams having a highest receive strength of the plurality of third beams.

6. The method of claim 1, wherein refining at least one of the first or second spatial colocation parameters comprises:
receiving, from the base station, a trigger indicating beam refinement with respect to the beam of the plurality of second beams associated with the determined second spatial colocation parameter and a plurality of third beams;
updating at least one of the first or second spatial colocation parameters based on the plurality of third beams; and
transmitting, to the base station, an indication of one of the plurality of third beams having a highest receive strength of the plurality of third beams.

7. The method of claim 6, further comprising:
determining a receive beam direction based on the indicated one of the plurality of third beams.

8. The method of claim 1, wherein refining at least one of the first or second spatial colocation parameters comprises:
receiving, from the base station, a trigger indicating beam refinement with respect to one or more of the plurality of first beams and a plurality of third beams;
updating at least one of the first or second spatial colocation parameters based on the plurality of third beams; and
transmitting, to the base station, an indication of one of the plurality of third beams having a highest receive strength of the plurality of third beams.

9. The method of claim 1, further comprising determining, based on the indicated one of the plurality of second beams, a receive beam direction for receiving signals from the base station.

10. The method of claim 9, further comprising receiving, from the base station, quasi-colocation indication signaling based on the indicated one of the plurality of second beams and the determined receive beam direction.

11. The method of claim 10, wherein the signaling is received via radio resource control (RRC) signaling.

12. The method of claim 10, wherein the signaling is received via downlink control information (DCI) signaling.

13. The method of claim 10, wherein the signaling is received via a media access control (MAC) control element (CE).

14. A method for wireless communications by a base station, comprising:
transmitting a plurality of first beams to a user equipment (UE), each beam of the plurality of first beams being associated with a first set of spatial colocation parameters;
receiving, from the UE, an indication of a first spatial colocation parameter associated with a beam of the plurality of first beams having a highest receive strength of the plurality of first beams;
transmitting a plurality of second beams to the UE based on the indication, the plurality of second beams being associated with a second set of spatial colocation parameters and covering a beam width of the beam of the plurality of first beams having a highest receive strength of the plurality of first beams;
receiving, from the UE, an indication of a second spatial colocation parameter associated with a beam of the plurality of second beams having a highest receive strength of the plurality of second beams; and
initiating a spatial colocation parameter refinement procedure based on one or more of the beam associated with the indicated first spatial colocation parameter or the indicated second spatial colocation parameter.

15. The method of claim 14, wherein initiating a spatial colocation parameter refinement procedure comprises:
transmitting a refinement procedure trigger to the UE including one or more spatial colocation parameters.

16. The method of claim 15, further comprising transmitting a plurality of third beams to the UE, the plurality of third beams being based on a beam width of the beam associated with the beam having a highest receive strength of the plurality of first beams and a beam angle associated with the beam having a highest receive strength of the plurality of second beams.

17. The method of claim 15, further comprising transmitting a refinement procedure trigger and a plurality of third beams to the UE, the plurality of third beams being based on the plurality of first beams associated with the first spatial colocation parameter.

18. The method of claim 15, further comprising transmitting a refinement procedure trigger and a plurality of third beams to the UE, the plurality of third beams being based on the indicated second beam.

19. The method of claim 15, wherein the refinement procedure trigger is transmitted via radio resource control (RRC) signaling.

20. The method of claim 15, wherein the refinement procedure trigger is transmitted via downlink control information (DCI) signaling.

21. The method of claim 15, wherein the refinement procedure trigger is transmitted via a media access control (MAC) control element (CE).

22. An apparatus for wireless communications, comprising:
a processor configured to:
receive a plurality of first beams from a base station, each beam of the plurality of first beams being associated with a first set of spatial colocation parameters,
determine, based on the plurality of first beams, a first spatial colocation parameter of the first set of spatial colocation parameters, wherein the determined spatial colocation parameter is associated with a beam of the plurality of first beams having a highest receive strength of the plurality of first beams,
transmit, to the base station, an indication of the determined first spatial colocation parameter,
receive a plurality of second beams from the base station based on the indication, the plurality of second beams being associated with a second set of spatial colocation parameters, wherein the plurality of second beams covers a beam width of the beam of the plurality of first beams having a highest receive strength of the plurality of first beams,
determine, based on the plurality of second beams, a second spatial colocation parameter of the second set of spatial colocation parameters, wherein the second spatial colocation parameter is associated with a beam of the plurality of second beams having a highest receive strength of the plurality of second beams,
transmit, to the base station, an indication of the determined second spatial colocation parameter, and
refine at least one of the first or second spatial colocation parameters; and
a memory.

23. The apparatus of claim 22, wherein the processor is configured to refine at least one of the first or second spatial colocation parameters by:
receiving, from the base station, a trigger indicating beam refinement with respect to a beam width from the beam associated with the determined first spatial colocation parameter and a beam angle associated with the determined spatial colocation parameter and a plurality of third beams;
updating at least one of the first or second spatial colocation parameters based on the second plurality of third beams; and
transmitting, to the base station, an indication of one of the plurality of third beams having a highest receive strength of the plurality of third beams.

24. The apparatus of claim 22, wherein the processor is configured to refine at least one of the first or second spatial colocation parameters by:
receiving, from the base station, a trigger indicating beam refinement with respect to the beam of the plurality of second beams associated with the determined second colocation parameter and a plurality of third beams;
updating at least one of the first or second spatial colocation parameters based on the plurality of third beams; and
transmitting, to the base station, an indication of one of the plurality of third beams having a highest receive strength of the plurality of third beams.

25. The apparatus of claim 22, wherein the processor is configured to refine at least one of the first or second spatial colocation parameters by:
receiving, from the base station, a trigger indicating beam refinement with respect to one or more of the plurality of first beams and a plurality of third beams;
updating at least one of the first or second spatial colocation parameters based on the plurality of third beams; and
transmitting, to the base station, an indication of one of the plurality of third beams having a highest receive strength of the plurality of third beams.

26. The apparatus of claim 22, wherein the processor is further configured to:

determine, based on the indicated one of the plurality of second beams, a receive beam direction for receiving signals from the base station.

27. An apparatus for wireless communications, comprising:
a processor configured to:
transmit a plurality of first beams to a user equipment (UE), each beam of the plurality of first beams being associated with a first set of spatial colocation parameters,
receive, from the UE, an indication of a first spatial colocation parameter associated with a beam of the plurality of first beams having a highest receive strength of the plurality of first beams,
transmit a plurality of second beams to the UE based on the indication, the plurality of second beams being associated with a second set of spatial colocation parameters and covering a beam width of the beam of the plurality of first beams having a highest receive strength of the plurality of first beams,
receive, from the UE, an indication of a second spatial colocation parameter associated with a beam of the plurality of second beams having a highest receive strength of the plurality of second beams, and
initiate a spatial colocation parameter refinement procedure based on one or more of the beam associated with the indicated first spatial colocation parameter or the indicated second spatial colocation parameter; and
a memory.

28. The apparatus of claim 27, wherein the processor is configured to initiate a spatial colocation parameter refinement procedure by:
transmitting a refinement procedure trigger to the UE including one or more spatial colocation parameters.

29. The apparatus of claim 27, wherein the processor is further configured to:
transmit a plurality of third beams to the UE, the plurality of third beams being based on a beam width of the beam having a highest receive strength of the plurality of first beams and a beam angle associated with the beam having a highest receive strength of the plurality of second beams.

30. The apparatus of claim 27, wherein the processor is further configured to:
transmit a refinement procedure trigger and a plurality of third beams to the UE, the plurality of third beams being based on one or more of:
a plurality of beams associated with the indicated first spatial colocation parameter, and
the indicated second spatial colocation parameter.

* * * * *